United States Patent

[11] 3,579,237

[72] Inventors Richard D. Steingart
Dubendorf, Switzerland;
Richard D. Wilmot, Brea, Calif.
[21] Appl. No. 836,010
[22] Filed June 24, 1969
[45] Patented May 18, 1971
[73] Assignee Hughes Aircraft Company
Culver City, Calif.

[54] METHOD AND APPARATUS FOR AZIMUTH BIAS ERROR CORRECTION OF SEQUENTIAL-OBSERVER DETECTORS
22 Claims, 6 Drawing Figs.

[52] U.S. Cl. .................................................. 343/16,
343/5
[51] Int. Cl. ...................................................... G01s 9/02
[50] Field of Search ............................................ 343/5 (DP),
7 (RS), 10, 11, 16

[56] References Cited
UNITED STATES PATENTS
3,353,177  11/1967  Wilmot .......................... 343/5(DP)

Primary Examiner—Richard A. Farley
Assistant Examiner—Malcolm F. Hubler
Attorneys—James K. Haskell and Walter J. Adam

ABSTRACT: A system is disclosed for the correction of azimuth bias error in sequential-observer detectors for surveillance radar systems which assume an average value of azimuth bias in declaring the leading and trailing edges of a target. After normal beam-splitting, the apparent azimuth of the target is corrected by subtracting the effect of half the sweeps that occurred without a video return while searching for the leading edge. Each such sweep has the effect of delaying declaration of a leading edge by one or two sweeps, depending on the pattern of video returns received.

Patented May 18, 1971

METHOD AND APPARATUS FOR AZIMUTH BIAS ERROR CORRECTION OF SEQUENTIAL-OBSERVER DETECTORS

BACKGROUND OF THE INVENTION

This invention relates to a method and apparatus for digital target detection and location in surveillance radar systems and, more particularly, to systems employing a sequential-observer detector for determining a beam-split azimuth of a target.

In contemporary radar systems for surveillance, the raw video return from a target is first quantized, i.e. converted to a series of binary signals having a value of 1 or 0 depending upon whether or not the raw video exceeds a threshold level. A video return (VR) that exceeds the threshold level of the quantizer is often called a hit. Thus, a VR is declared in the form of a signal of predetermined amplitude if, for a radar return, the VR amplitude exceeds the threshold level of the quantizer. For a beacon return, a VR is declared if a valid bracket coincidence reply is received.

Sequential observer detectors are employed in surveillance radar systems to automatically detect targets that have a sufficient number of hits at a particular range to satisfy a predetermined criterion. The entire surveillance area is divided into range intervals often called range bins, and a sequential-observer detector is associated with each range interval so as to record a history of video returns for the purpose of target detection at each range. As the radar antenna scans past a target at a given range, hits should be received from successive radar sweeps, i.e. from successive azimuths.

Recognizing a pattern of hits from a target at a given range interval in spite of noise in the system is accomplished by proper setting of the criterion in the sequential-observer detector. For example, if the sequential-observer detector is implemented in the form of an up-down counter incremented in the form of an up-down counter incremented by hits and decremented by misses (video sweeps not producing hits), the criterion may be set as a count of six. However, a signal indicating the criterion has been satisfied merely declares that a target is present at the given range interval.

To obtain a center bearing on the target, it has been the practice to operate the up-down counter of the sequential-observer detector for a given range in reverse once the presence of a target has been declared. Thus, the up-down counter is operated in one mode to find the "leading edge" of a target and in an inverter mode to look for the "trailing edge" of the target. In the inverted mode, the up-down counter is first reset to 0 and then incremented by each miss and decremented by each hit until the same criterion (count of six) is satisfied. At the time a target report is sent to a tracking computer for analysis and the sequential observer cycle is reinitiated for the same range as the radar antenna continues to scan in azimuth.

The target report sent to the computer comprises the azimuths of the "leading" and "trailing edges" of the target. The tracking computer then calculates a center bearing on the target by a technique referred to as beam-splitting. The technique consists essentially of computing the average of the leading and trailing edge azimuths.

The problem of locating the center of a target using the beam-splitting technique is that there is a delay in declaring the leading and trailing edges of the target since at least six hits must be received before the leading edge is declared and, on the other side of the target, at least six misses must occur before the trailing edge is declared. Assuming that statistically noise will produce spurious hits and misses at the same rate on each side of the target, the bearing of the target can be easily corrected in the beam-splitting technique by subtracting from the computed average an azimuth bias equal to the angle of six successive sweeps. This technique of compensating for a beam-split azimuth bias assumes an average value of bias for all target return patterns. If the actual return pattern is not the same as the assumed return pattern, an azimuth bias-error is introduced.

Extensive studies have been made of radar and beacon returns to determine how often target return patterns having spurious misses will influence the beam-split azimuth accuracy, and it was found that 23 percent of the radar targets and 45 percent of the beacon targets would have beam-split azimuth errors due to spurious misses in the target return patterns. It was further determined that spurious misses are significant in automatic video processors only in determining the leading edge of the target. To affect trailing edge determination, target patterns would require more spurious hits than misses and it was found that the probability of a spurious hit is about one-tenth the probability of a spurious miss; consequently only special patterns of misses in unique positions of the target pattern actually affect trailing edge determination.

OBJECTS AND SUMMARY OF THE INVENTION

An object of the present invention is to provide an improved method for beam-split azimuth determination in automatic video processors.

Another object of the present invention is to provide apparatus for determining azimuth bias errors in a beam-splitting system for automatic video processors using sequential-observer detectors.

In accordance with the present invention, a sequential-observer detector utilized for determining leading and trailing edges of a target at a given range is provided with a separate leading edge delay counter to determine a more exact value of azimuth bias to compensate for delays in determining the leading edge of a target. In a preferred embodiment, that is accomplished according to the following algorithm. Once a miss has been detected during a search for a target, and a leading edge has not been declared by a sequential-observer detector, determine whether or not the sequential-observer detector was at a count of zero after the last sweep. If so, reset the leading edge delay counter to zero unless the leading edge delay counter is at the count of two, in which case the count of two is incremented by one, and if not, increment by two unless the leading edge delay counter has reached a predetermined maximum count, in which case the maximum count is retained, or the count is within one unit of the maximum, in which case the counter is incremented by 1. Once the trailing edge of the target has been declared, the content of the separate leading edge delay counter is transferred to a computer system for azimuth error correction. Then when the apparent azimuth of the target is computed by conventional beam-splitting techniques, one-half of the numerical value transferred from the leading edge delay counter is subtracted from the apparent azimuth in terms of sweep angles to provide a corrected azimuth for the center of the target.

The novel features that are considered characteristic of this invention are set forth with particularity in the appended claims. The invention will best be understood from the following description when read in connection with the accompanying drawings.

For a complete understanding of the present invention, the operation of a surveillance radar system employing a beam-splitting technique will first be described with reference to FIG. 1. The radar surveillance system includes a transmitter-receiver 10 which generates quantized video signals together with azimuth and range signals employed to determine a target azimuth using a sequential-observer detector 11.

The sequential-observer detector automatically detects the leading edge of a target that has a sufficient number of video returns, often referred to as hits, at a particular range to satisfy a predetermined criterion. Once that criterion has been satisfied, the sequential-observer detector 11 declares a leading edge and transmits a signal to a leading edge azimuth store control unit 13 to store the contents of an azimuth counter 12 which is incremented by each azimuth signal produced during successive sweeps as the radar transmitter-receiver 10 scans in azimuth.

Once a leading edge has been declared, the sequential-observer detector 11 is reset and a search for the trailing edge of the target is commenced. The criterion for the trailing edge is the same as for the leading edge, but as will be more fully appreciated hereinafter, operation of the sequential-observer detector 11 is inverted since, to detect the leading edge of a target, the pattern of hits will determine when the leading edge of the target is to be declared, and to determine the trailing edge of a target, the pattern of misses (where a miss is the absence of a hit during a sweep at a given range) determines when a trailing edge is to be declared. When a trailing edge is declared, a trailing edge azimuth transfer control unit 14 will cause the contents of the azimuth of the counter 13 to be stored in a buffer register 15. At the same time, a leading edge azimuth transfer control unit 16 will transfer the leading edge azimuth from the unit 12 to the buffer register 15, and a range transfer control unit 17 transfers the contents of a range counter 18 into the buffer register 15.

Figure 1:
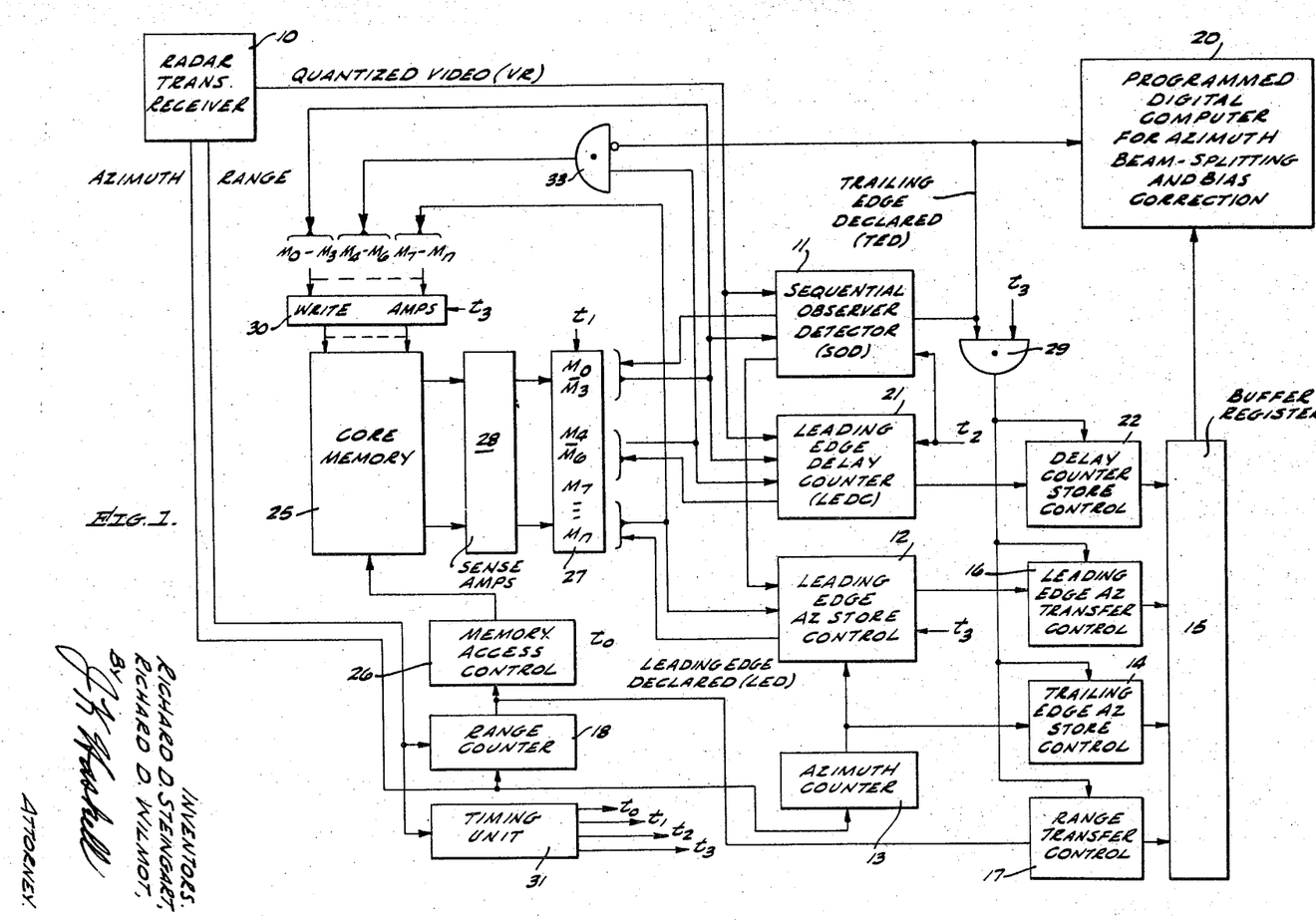
FIG. 1 is a schematic block diagram of a radar surveillance system embodying the azimuth bias error correcting method of the present invention.
Figure 2:
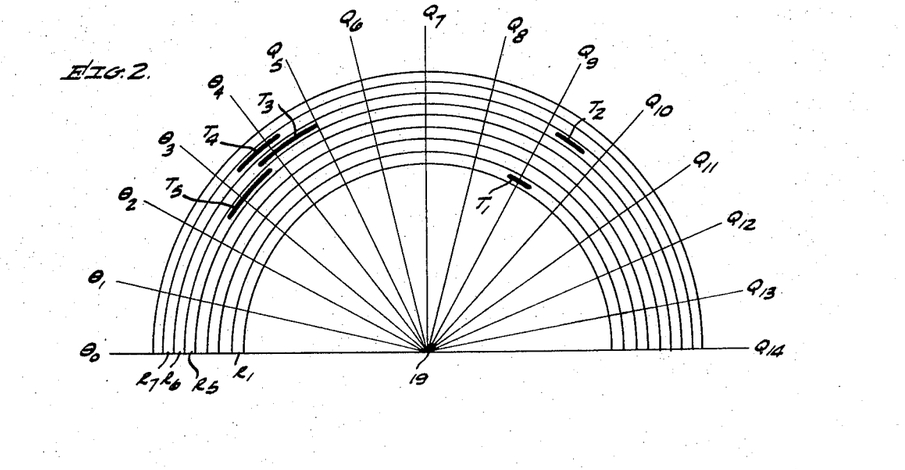
FIG. 2 is an azimuth range-diagram useful in explaining the teachings of the invention.
Figure 3:
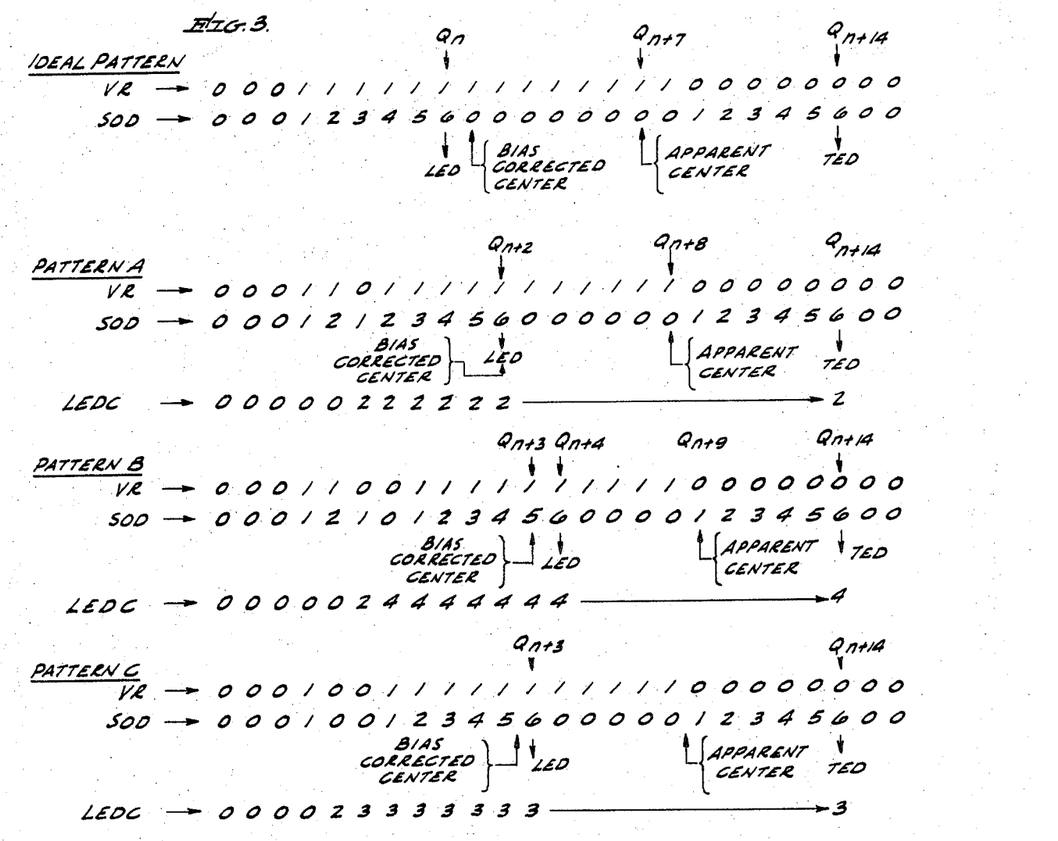
FIG. 3 illustrates examples of target return patterns useful in understanding the operation of the present invention.

FIG. 2 shows an azimuth-range diagram which, together with FIG. 3, will facilitate understanding the objectives of the present invention. In that diagram, it is assumed that the radar transmitter-receiver 10 of FIG. 1 is located at point 19, and that it transmits a beam at successive azimuths, only fifteen of which are shown at azimuths $\theta_0$ to $\theta_{15}$ over half of a 360°-scan. In actual practice, the azimuth difference between adjacent beams is only a fraction of a degree.

Each transmitted beam commonly referred to as a sweep will be reflected back to point 19 at different times by targets at different ranges. Therefore a range counter may be employed to sample received signals at successive times during each sweep corresponding to successive range interval $R_1...R_5$, $R_6$, $R_7$.... Once all range intervals, sometimes referred to an range bins, have been sample, the transmitter-receiver is caused to sweep at the next azimuth by transmitting a radar signal and sampling video returns at successive intervals. The video returns may be displayed, such as with a conventional cathode ray tube in a plan-position indicator (PPI) arrangement. The result would be a presentation similar to that illustrated in FIG. 3 indicating targets in range bins $R_1$, $R_5$, $R_6$ and $R^7$ at different azimuths, such as a target $T_1$ in range bin $R_1$ at azimuth $\theta_9$.

It is often desirable to automatically report the presence of targets by range and bearing only, and not provide a PPI display which requires interpretation. Various digital techniques have been devised for locating the centers of targets, as reported in "An Analysis of Signal Detection and Location By Digital Methods" published by G. P. Dinneen and I. S. Reed in IRE Transactions-Information Theory, Mar. 1956, at pages 29 to 38. One technique involves the use of an up-down counter in a sequential-observer detector. The counter is designed to count up when a video return is received and down when one is not received during successive sweeps for a given range. A different counter is employed for each range bin. When a predetermined threshold is reached, a target is declared. However, such a declaration can only be associated with the leading edge of the target. To find the center of the target it is necessary to employ a similar but inverted scheme to identify the trailing edge. The apparent center of the target is then the average azimuth of the two declared azimuths, less a fixed bias value associated with the threshold count employed.

An ideal video return pattern illustrated in FIG. 3 will clarify the beam-splitting technique which employs a sequential-observer detector. The detector is implemented with an up-down counter which increments by one for each video return received from a target at a given range, such as the target $T_1$ of FIG. 2, and decrements by one for each lack of return during a given sweep, except when a count of zero is reached. When a predetermined threshold count is reached by the counter, a target is declared. The threshold count selected is determined by the a priori probability of noise producing false patterns of hits and misses. Here the threshold is set at six, but for some environments, it may be set at seven, or five.

In the ideal pattern of FIG. 3, once a hit (VR) is received, as represented by a bit 1 in the first row, misses do not occur during subsequent sweeps until the trailing edge of the target is reached. Therefore, after six sweeps, a target leading edge (LED) is declared at the sweep $Q_n$ and the sequential-observer detector (SOD) is reset to zero instead of being advanced to the count of six. The process is inverted to search for the tailing edge. When the sequential-observer detector has received a total of six misses, a tailing edge is declared (TED) and the apparent azimuth is found to be $Q_{n+7}$ by averaging the azimuths $Q_n$ and $Q_{n+14}$. However, it is readily apparent that there is a bias affecting the determination of target center. Here the actual bias in 5.5 sweeps, but as will be seen from patterns A to C of FIG. 3, the actual bias is often exactly six sweeps so that it is convenient to so program the target analysis as to always subtract six sweeps from the apparent azimuth.

In pattern A, two hits are followed by a miss. By comparing with the ideal pattern, it may be readily seen that the effect of the one miss is a delay of two sweeps in declaring the leading edge of the target. Because of averaging, the net effect is one sweep error in the bias corrected center found by subtracting six sweeps from the apparent center. In pattern B, two hits are followed by two misses, each of which has an equal effect on the accuracy of the bias corrected center. In pattern C still another hit-miss sequence is illustrated consisting of two misses after a single hit. By comparing the pattern C with the ideal pattern, it may be seen that the effect is a delay of three sweeps in declaring a leading edge, and therefore a net error of 1.5 sweeps in the bias corrected azimuth.

The present invention provides a correction for this bias-error by counting misses received after an initial hit. Each miss is counted as one or two sweep delays in declaring a target leading edge, depending upon its position in the VR pattern, until a leading edge is declared, or until a maximum count of seven is reached. That maximum is not critical; it was determined by the a priori probability that noise would not cause a delay in declaring a leading edge greater than seven sweeps. As in the case of the threshold count, experience in different environments may indicate a large, or smaller, maximum should be used.

A row labeled LEDC in the patterns A, B and C of FIG. 3 represents the leading edge delay counter operation. The count achieved at the time a leading edge is declared, as indicated by the legend LED, is retained until a trailing edge is declared. It is then reported as part of the target data. For example, the count of four achieved for pattern B is reported along with the respective azimuths $Q_{n+4}$ and $Q_{+14}$ of the leading and trailing edges. The contents of a range counter is also reported to complete the target report. A computer then determines the bias corrected center by averaging the azimuths $Q_{n+4}$ and $Q_{n+14}$, and subtracts six from that average for a bias corrected azimuth of $Q_{n+3}$. By comparing with the ideal pattern where the bias corrected center is $Q_{n+1}$, it may be seen that for the pattern B, the bias error is two sweeps which can be corrected by subtracting half the count of the leading edge delay counter in terms of sweeps. As a further example, consider the pattern C where the bias corrected center is found to be $Q_{n+2.5}$. By subtracting half of the count of three, a bias error corrected azimuth of $Q_{n+1}$ is found as the center of the target.

The centers of other targets are found in the same way, such as of targets $T_2$ to $T_5$ in FIG. 2, even with more than one target in the same range bin, such as targets $T_2$ and $T_3$. This is possible because once the trailing edge of the target $T_3$ is declared at the azimuth $Q_5$, a target report is made and the entire process is repeated. In that regard, it should be noted that separate counters are provided for the various range bins, but as will be more fully appreciated hereinafter, a logic network for only one range bin need be provided if, during a given sweep, numbers are fetched from a storage memory, operated upon and restored in memory in a predetermined range bin sequence controlled by the range counter 18 (FIG. 1). The entire range bin sequence is repeated once during each sweep. Then once a trailing edge is detected, a target report is made by transfer of target data to the buffer register 15.

A programmed digital computer 20 samples the buffer register 15 periodically or on demand. For example, if leading and trailing edges have been declared for a given range, the computer may be notified to read in a target report from the register 15. Alternatively, the computer 20 may read target reports from the register only periodically as determined by its own internal program. In that case the register 15 would be expanded to hold many target reports. Queuing techniques developed in general data processing systems may be employed to advantage with such an expanded buffer register, such as advancing all reports as a given one is read, and entering all new reports at the end of the register if a shift register, or some similar form of core memory buffer, is used.

The antenna azimuths at the times of leading and trailing edge detections are used by the programmed digital computer 20 to calculate the azimuth of the target by computing the average of the leading and trailing edge azimuths and then subtracting the minimum number of radar sweeps required to detect each of the leading and trailing edges of the target. For example, the sequential-observer detector 11 implemented in the form of an up-down counter is incremented by each hit while looking for the leading edge of the target and decremented by each miss, except when a count of zero has been reached, until the detector count reaches a predetermined threshold, such as a count of six. At that time a leading edge is declared, the up-down counter is reset to zero and the process is inverted to look for a trailing edge by incrementing the counter in response to each miss and decrementing the counter in response to each hit, except when a count of zero is reached, until the same threshold is reached, at which time a trailing edge is declared.

When the leading edge of the target is declared, the contents of the azimuths counter 13 are stored by the unit 12 until the trailing edge is declared at which time a target report is sent to the programmed digital computer 20 via the buffer register 15 as just described. Since a minimum number of six hits must be received for a given range before the leading edge of the target is declared, and similarly a minimum of six misses must be received before a trailing edge is declared, there is a minimum delay of six radar sweeps in obtaining the azimuths used by the beam-splitting technique of determining the center azimuth of the target. Accordingly, the conventional beam-splitting technique calls for subtracting an azimuth bias of six sweeps when the criterion for declaring leading and trailing edges is a count of six.

Thus the prior method of compensating for beam-split azimuth delay assumed the sequential-observer detector 11 introduced an average value of azimuth bias for all target return patterns detected at a particular radar return threshold level and subtracted this constant bias from the beam-split azimuth of each target. Consequently an error was introduced if the actual target return pattern was not the same as the assumed or average target return pattern as noted hereinbefore with reference to FIG. 3. This azimuth bias error is corrected by the present invention implemented in the form of a leading edge delay counter 21 used to accumulate the effect of lack of returns (misses) of a target on the declaration of a leading edge azimuth.

The delay counter 21 monitors both the target returns (hits and misses) and the count of the sequential-observer detector 11, and for each lack of return prior to leading edge determination, the delay counter 21 is incremented by the number of sweeps that the leading edge declaration will be delayed. Once a leading edge of a target is declared, the contents of the delay counter 21 are retained until a trailing edge is declared. At that time, the contents of the delay counter 21 are transferred to the buffer register 15, along with other target report data, by a delay count transfer control unit 22 as noted hereinbefore. Thus, a leading edge delay count is transferred to the digital computer 20 via the buffer register 15. There the leading edge delay count is used to correct the bias error of the beam-split azimuth by subtracting a number of sweep angles equal to half of the leading edge delay count.

Before describing the method for correcting bias error more fully, the general organization of a radar surveillance system employing the beam-splitting technique will first be more fully described with respect to the manner in which a core memory 25 is used to provide memory cells for at least three separate registers at each addressable memory locations, one location for each range indicated by the range signal from the radar transmitter-receiver 10 at a given azimuth. For example, the core memory 25 may have 1,024 addressable memory locations each comprising $n$ bits, where $n$ is an arbitrary number such as 12, divided into: a first register group of four bits, $C_0$, $C_1$, $E_2$ and $C_3$; a second register group of three bits $C_4$, $C_5$ and $C_6$; and a third register of a plurality of bits $C_7$ to $C_n$.

Each of the memory locations is addressed by a memory access control unit 26 which receives the contents of the range counter 18 in order to read from and write into successive memory locations corresponding to successive ranges during a given azimuth sweep. The radar transmitter-receiver 10 delivers a range signal for each range of a given azimuth sweep which occurs between azimuths signals that are accumulated in the azimuth counter 13.

If the radar transmitter-receiver 10 scans 360°, the azimuth counter 13 will be automatically recycled when $m$ azimuth signal have been counted, where $m$ is an arbitrary number of azimuth sweeps per 360°scan. Between azimuth signals, the range counter 18 will receive a predetermined number of range signals to provide successive counts from zero to 1,023. Following the next azimuth signal, the first range signal will recycle the range counter 18 to zero for the first range bin.

At a given range during a particular azimuth sweep, a word comprising bits $C_0$ to $C_n$ is read from the memory location of the core memory 25 being addressed by the memory access control unit 26. The operation of the core memory 25 is conventional in that the word being read is stored in an M-register 27 via sense amplifiers 28.

The M-register is a conventional static register, each bit position of which is set at a time $t_1$ in accordance with a binary digit being read from a core via one of the sense amplifiers 28. In order to allow for time delays in switching cores in the memory 25 and driving the sense amplifiers 28 to proper binary levels before setting the M-register at time $t_1$, the memory access control unit 26 is pulsed at a sufficiently earlier time $t_0$ for the read operation of the core memory 25 to follow a normal manner at time $t_1$. Thereafter, the three groups of binary digits $M_0$ to $M_3$; $M_4$ to $M_6$; and $M_7$ to $M_n$ are available for the respective operations of the sequential-observer detector 11, the leading edge delay counter 21 and the leading edge azimuth store control unit 12.

The binary digits $M_1$ to $M_3$ comprise the counter digits of the sequential-observer detector 11 for a given range bin. If a hit is received while searching for the leading edge of a target, the count represented by the signals $M_1$ to $M_3$ is incremented by one at a time $t_2$. This ability of the sequential-observer detector to receive signals $M_1$ to $M_3$ and to make changes in digits stored in the register 27 is indicated by the double signal transfer paths, one path indicating signal flow from the register 27 and the other signal flow to it.

If a hit being counted causes the number being stored in bit positions $M_1$ to $M_3$ of the register 27 to reach six, a leading edge is declared in the form of a binary 1 which is stored in bit position $M_0$ of the M-register by the sequential-observer detector 11. The leading edge azimuth store control unit 12 samples the bit position $M_0$ at time $t_3$, for the purpose of causing the contents of the azimuth counter to be stored in bit positions $M_7$–$M_n$ as the word (bit positions $M_0$ to $M_n$) are restored in the memory 25. During subsequent sweeps, the bit 1 in position $M_0$ causes the operation of the sequential-observer detector to be inverted, as by substituting misses for hits in its logic network for incrementing in response to each miss and substituting hits for misses in its logic for decrementing in response to each hit.

Figure 4:
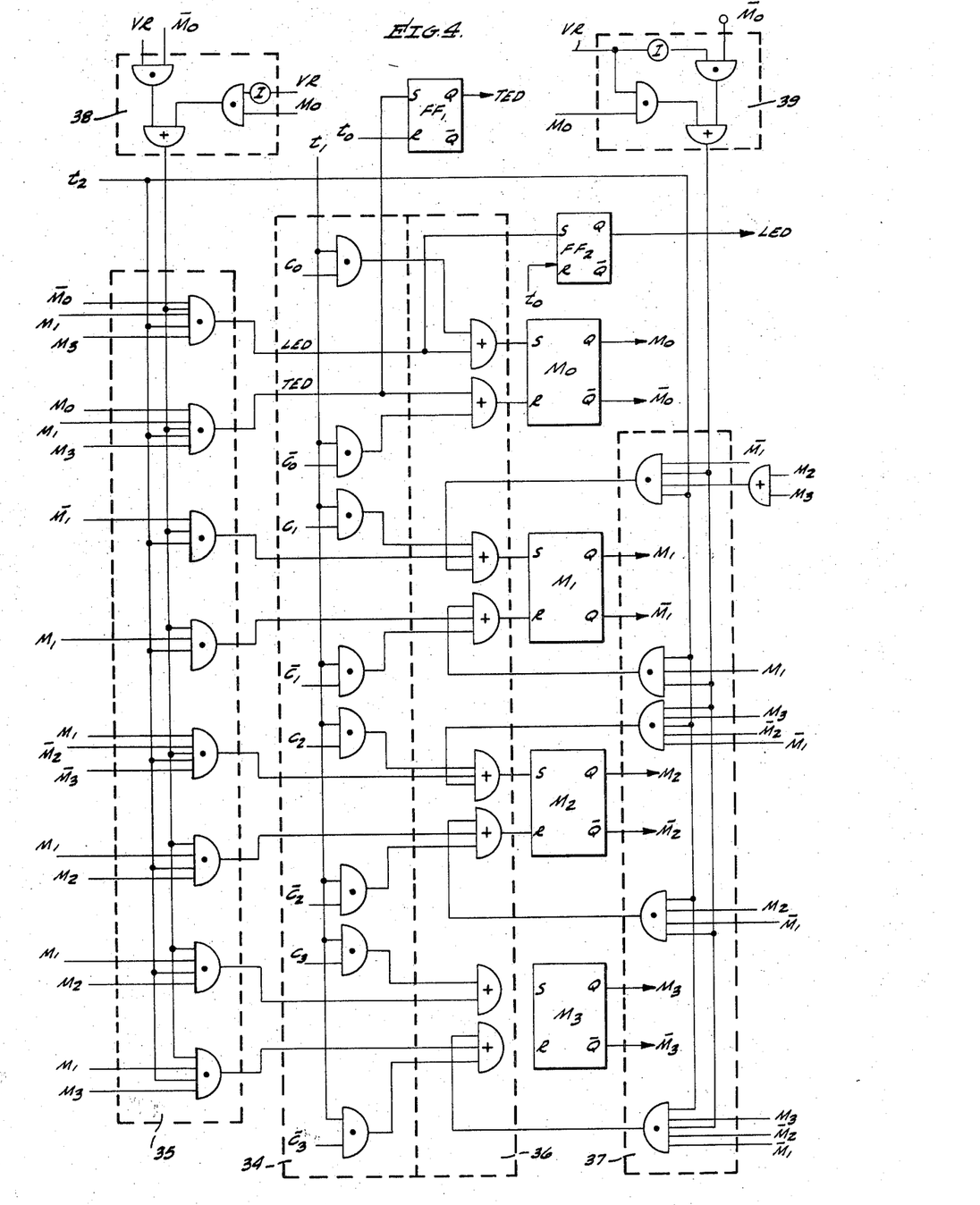
FIG. 4 is a logic diagram for implementing a sequential-observer detector in the system of FIG. 1.

FIG. 4 illustrates an exemplary implementation of the sequential-observer detector 11. It comprises a logic network for bit positions $M_0$ to $M_3$ of the M-register 27. Each position may consist of an R-S flip-flop as shown and identifying by the standard convention which includes identifying true (Q) and false ($\overline{Q}$) signals by the same reference characters, such as flip-flop $M_1$ having a true output signal $M_1$ and a false output signal $\overline{M}_1$.

Bit positions $M_1$ to $M_3$ are employed as binary memory elements for the process of counting hits and misses, while the flip-flop $M_0$ is employed to store a signal LED indicating a leading edge has been declared, until a trailing edge is declared, at which time a signal TED removes the signal LED by causing the flip-flop $M_0$ to be reset. At time $t_3$ of each cycle for a given range bin, the contents of the flip-flops $M_0$ to $M_3$ are restored in the core memory 25. Then at time $t_1$ of the next cycle for that range bin, the stored bits are read through sense amplifiers 28 into the flip-flop $M_0$ to $M_3$ via a bank of AND gates 34. The input terminals of the AND gates 34 are identified by the letter C, indicating signals which appear there are from the core memory. The subscript associated with each letter C indicates the bit position of the signal represented.

At time $t_2$ the contents of the flip-flops $M_1$ to $M_3$ are incremented by one if a hit (VR) is received and a leading edge has not been declared, i.e., a binary 0 is stored in the flip-flop $M_0$. If the contents of the flip-flops $M_1$ to $M_3$ represent a count of five in binary form, the contents of the flip-flops are incremented to a count of zero by the next hit received. At the same time, the flip-flop $M_0$ is set. The logic network for counting with a radix of five so as to recycle to zero and effectively propagate a "carry" into the bit position $M_0$ consists of a bank of AND gates 35 having their output terminals connected to S and R terminals of the flip-flops by a bank of OR gates 36. While contents of the flip-flops $M_0$ to $M_3$ are being incremented by hits, they are also being decremented by misses (VR) through a bank of AND gates 37. Once a leading edge of a target is declared by the propagation of a "carry" into bit position $M_0$, logic networks 38 and 39 connected to the output terminals of the flip-flop $M_0$ invert the operation of the logic networks 35 and 37 by substituting misses ($\overline{VR}$) for hits (VR) in the logic network 35, and hits (VR) for misses ($\overline{VR}$) in the logic network 37. Thereafter, when a count of five misses is reached and another miss occurs during the next successive sweep, another "carry" is effectively generated by the logic function TED= $\overline{VR}\, M_0\, M_1\, M_3\, t_2$ to reset the flip-flop $M_0$ and set a flip-flop $FF_1$ which stores the function TED until the next time $t_0$, at which time it is reset. At the time $t_3$ just prior thereto, an AND gate 29 is enabled by the true output terminal (Q) of the flip-flop $FF_1$ to transmit a timing signal $t_3$ and thereby cause a target report to be transferred to the buffer register 15.

It should be noted that when the logic network 35 produces a signal TED, all of the flip-flops $M_0$ to $M_3$ are reset so that when their contents are restored through write amplifiers 30 at time $t_3$ they will be zero for a new target identification process. Consequently, no action need be taken to reset the sequential-observer detector 11 once a trailing edge of a target is declared. The only resetting action required is the resetting of flip-flop $FF_1$ which is automatically done by the next timing signal $t_0$ while the core memory 25 is being addressed for the next range bin via the memory access control 26.

Figure 6:
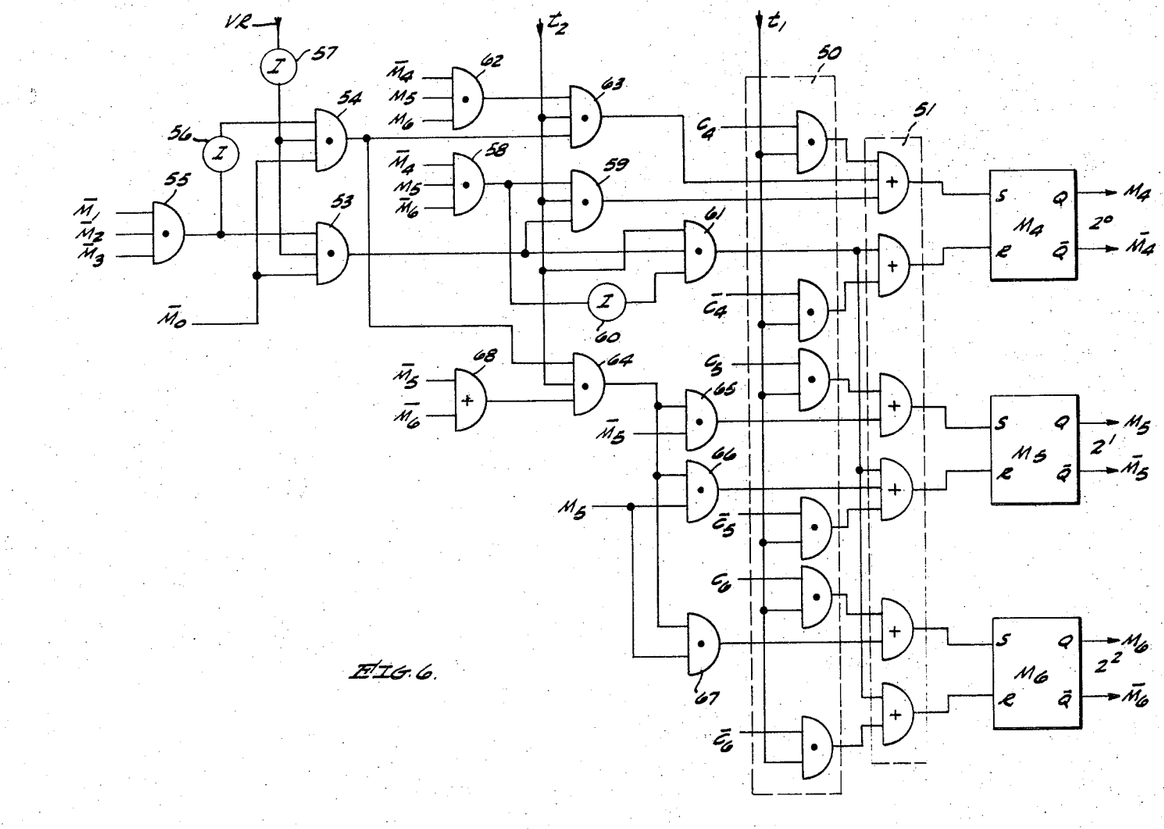
FIG. 6 is a logic diagram for implementing the flow chart of FIG. 5 in the radar surveillance system of FIG. 1.

Returning now to the general description with reference to FIG. 1, at time $t2$, the contents of the bit positions $M_4$ to $M_6$ of the register 27 are caused to be incremented, reset to zero or held for recirculation by the leading edge delay counter 21 comprising a logic network illustrated in FIG. 6 if a leading edge has not been declared. Thus, the three registers of the sequential-observer detector 11, leading edge delay counter 21, and leading edge azimuth control unit 12, are comprised of flip-flops $M_0$ to $M_n$ arranged in respective groups $M_0$ to $M_3$, $M_4$ to $M_6$, and $M_7$ to $M_n$.

The output terminals of those groups of flip-flops are connected to the respective delay count transfer control unit 22, leading edge azimuth transfer control unit 16 and trailing edge azimuth transfer control 14. In that manner, their contents may be transferred to the buffer register 15 at time $t_3$ if detection of a trailing edge has been declared by the sequential-observer detector in the form of a signal at an input terminal of an AND gate 29 as just described with reference to FIG. 4.

The output terminals $M_4$ to $M_n$ of register 27 are also connected to input terminals of write amplifiers 30. At time $t_3$ their contents are restored in the memory 25 before the range counter 18 is again incremented by a range signal to address the next memory location.

A timing unit 31 provides the four successive timing signals ($t_0$, $t_1$, $t_2$ and $t_3$) and distributes them for use in a conventional manner as illustrated in FIG. 1 for synchronizing the steps of: reading the core memory 25; sampling the sense amplifiers 28 to transfer the contents of the core memory location addressed into the M-register 27; altering the contents of bit positions $M_0$ to $M_6$; and restoring in the same core memory location the contents of bit positions $M_0$ to $M_n$ through the write amplifiers 30, except that if a bit 1 is stored in position $M_0$ at time $t2$, the contents of the azimuth counter 13 are stored in place of bit positions $M_7$ to $M_n$. That is readily accomplished by two banks of AND gates (not shown), a first bank normally enabled by a flip-flop $FF_2$ (FIG. 4) for recirculation until it is set to temporarily store an LED signal once a leading edge is declared, and a second bank of AND gates enabled by the flip-flop $FF_2$ while it is set for a period from time $t_2$ to the next time $t_0$. At the intervening time $t_3$, the contents of the azimuth counter 13 is stored in the memory 25 in place of the contents of the flip-flops $M_7$ to $M_n$.

When a target report is transferred to the buffer register 15 in response to a signal TED, it is necessary that the leading edge delay counter 21 be cleared. That is accomplished by connecting each of the flip-flops $M_4$ to $M_b$ to a different input terminal of write amplifiers 30 by a separate inhibit gate represented in FIG. 1 by a single gate 33 inhibited by the signal TED which enables the AND gate 29.

The bit positions $M_7$ to $M_n$ of the leading edge azimuth store control unit 12 need not be reset since the leading edge azimuth count being transferred to the buffer register at that time will be replaced by a different azimuth count when the next leading edge is declared for that range. Thus, once an azimuth count has been stored through the leading edge azimuth store control unit 12, it is recirculated through the core memory 25 even after it is transferred to the buffer register 15 until it is replaced by a different azimuth count.

As will be seen from a description of the detailed logic network for the leading edge delay counter 21, a number stored in its bit positions $M_4$ to $M_6$ is altered during each successive sweep at time $t_2$, unless a leading edge has been declared or a count of seven has been reached. Then at time $t_3$ the contents of bit positions $M_4$ to $M_6$ are restored in the core memory 25. Once a leading edge has been declared, the contents are recirculated without alteration each time the same memory location is addressed by the range counter 18 until a trailing edge is declared for that range. At that time the contents of the bit positions $M_4$ to $M_6$ are transferred to the buffer register 15 as noted hereinbefore.

It should be noted that the general organization illustrated in FIG. 1 and the logic network of the sequential-observer detector 11 shown in FIG. 4 are by way of example only. Other organizations for a radar surveillance system employing the beam-splitting technique may be improved by a similar leading edge delay counter which may be implemented as shown in FIG. 6 or in a different manner to meet the requirements of different operating environments. Thus, the organization described with reference to FIG. 1 is intended to be just representative; particular details have been give only to provide an operating environment for the illustrative logic diagram of FIG. 6.

Figure 5:
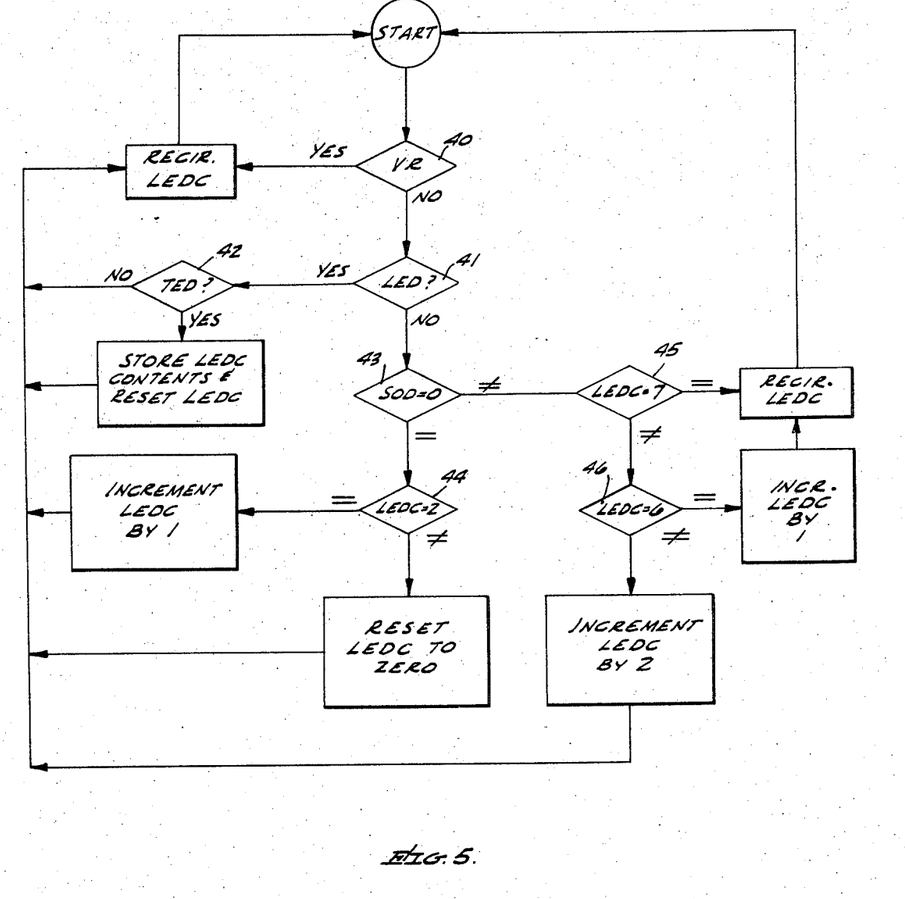
FIG. 5 is a flow chart for the bias error correcting method of the present invention.

The broadest aspects of the present invention may best be understood from the following description of the flow chart illustrated in FIG. 5 which not only disclosed a method of providing an azimuth bias error correction but also defines details of implementation for any operating environment. For example, the flow chart of FIG. 5 has been translated into the logic diagram of FIG. 6 for the organization of a surveillance radar postulated in FIG. 1 as an exemplary environment for the present invention.

A few preliminary examples will facilitate understanding the flow chart of FIG. 5. In the first example, an ideal leading edge pattern is assumed comprising an uninterrupted series of hits as shown in FIG. 3. The sequential-observer detector will receive each hit and be incremented by one as the radar transmitter-receiver scans through successive sweeps until a count of six is reached by the sequential-observer detector, at which time an LED signal is general and the sequential-observer detector is reset to zero.

The sequential-observer detector remains reset at zero until the first miss occurs at which time it is incremented. Thereafter, the sequential-observer detector is incremented by misses and decremented by hits until a count of six is reached. At that time a trailing edge is declared by the generation of a signal TED. Meantime, since an ideal return pattern has been assumed, the leading edge delay counter remains reset at zero so that the beam-split azimuth is the average of the azimuths of the leading and trailing edges detected, and the bias-compensated, beam-split azimuth is that average less the angle of six sweeps. That bias compensation is automatically made at the time the average is computed. A bias-error correction is also made by subtracting one-half of the contents of the leading edge delay counter, but in the case of an ideal return that correction is zero.

Next assume a target return pattern having a miss following two successive hits as in the typical pattern A of FIG. 3. The operation of the sequential-observer detector and the leading edge delay counter in response to that pattern are both shown in FIG. 3. It should be noted that the miss occurs before a leading edge is declared by the sequential-observer detector and while the count in the sequential-observer detector from the last sweep is greater than zero (i.e. not equal to zero). Since the leading edge delay counter has not reached a maximum count of seven and is not within one increment of that maximum (i.e. not equal to six), the leading delay counter is incremented by two. Thereafter, since no other miss occurs, the count of two is retained even after the leading edge is declared by the sequential-observer detector until the trailing edge of the target pattern is detected upon the sequential-observer detector being incremented to a count in excess of six in response to misses. At that time, the leading edge delay count of two is reported for the declared leading edge of the target. Accordingly, upon computing the average azimuth, one sweep angle is subtracted from the average for a bias-error corrected beam-split azimuth.

If the return pattern is such that a count of six is reached in the leading edge delay counter before still another miss occurs the leading edge delay counter is incremented by only one so that when the trailing edge of the target is declared, the bias-error correction reported is the maximum count of seven. A bias-error corrected azimuth would then be the apparent average azimuth less 3½ sweeps regardless of how many more misses occur before the leading edge of the target is declared.

This maximum bias-error correction was derived from an analysis of a very large number of radar target and beacon reports. Less than 1 percent of the target reports had more than three misses affecting leading edge detection. The data also showed that it was not necessary to decode all possible combinations of hits and misses.

Trailing edge determination using the sequential-observer detector was not noticeably affected by different combinations of hits and misses in the target return pattern. Therefore, no bias-error correction is required for the trailing edge azimuth. However, if further studies or different operating environments should indicate the desirability of providing a bias-error correction for the trailing edge azimuth, the same method may be employed by simply inverting the operation of the leading edge delay counter such that hits are substituted for misses and vice versa in its operation, just as in inverting the operation of the sequential-observer detector to look for the trailing edge.

Next consider pattern B of FIG. 3 having two successive misses after two successive hits. The first miss increments the leading edge delay counter by two as in the example of pattern A. The second miss again increments the leading edge delay counter by two for the same reasons given for incrementing by two in response to the first miss.

Next consider return pattern C of FIG. 3 having two misses after one hit. The first miss increments the leading edge delay counter by two as before but the second miss occurs while the sequential-observer detector is equal to zero and the leading edge delay counter is equal to two. The example shows that the delay in declaring the leading edge of the target is exactly three sweeps; therefore, the azimuth bias-error correction reported is the count of three. In the previous two examples, the delays in declaring the leading edges are two and four sweeps, respectively, so that the bias error corrections are two and four, respectively.

If in the example of pattern C a third miss had occurred in succession, the study of return patterns referred to hereinbefore indicated that the single leading hit should be ignored in declaring the leading edge of the target; i.e. it is more probable that the first hit is due to noise and not due to a target. Therefore, if a third miss occurs while the sequential-observer counter is equal to zero and the count of the leading edge delay counter is not equal to two, instead of incrementing the leading edge delay counter by one or two, the leading edge delay counter is reset to zero. In that manner, the bias-error correction determination can be reinitiated at the time detection of the leading edge of the target pattern is reinitiated by the next hit.

In all of these examples, each hit causes the contents of the leading edge delay counter to be recirculated without alteration until a leading edge is declared. Thereafter, either a hit or a miss will cause the contents of the leading edge delay counter to continue to be recirculated unaltered until a pattern of misses causes a trailing edge to be declared during a given sweep at which time the contents of the leading edge delay counter are reported out to the computer and zero is substituted for the contents as they are restored in memory.

Referring now to FIG. 5, the flow chart describes the operation of a leading edge delay counter for determining bias-error correction in a surveillance radar system employing a beam-splitting technique according to the foregoing examples. The operation starts with a range signal which initiates generation of the timing signals $t_0$ to $t_3$. If a hit occurs before the next range signal occurs, the contents of the leading edge detector are simply recirculated by restoring them in memory without alteration at time $t_3$. Thus the first step indicated by the decision box 40 is a test for the presence of a hit. No express test need be made for that decision; the contents of the leading edge delay counter are simply restored in memory unaltered after the following decisions (made at time $t_2$) fail to indicate that the contents of the leading edge delay counter should be altered. In other words, the contents of the leading edge delay counter are recirculated unaltered unless some decision is made to alter the contents.

The second step indicated by the box 41 is to determine whether a leading edge has been declared, as signified by the presence of a bit 1 in position $M_0$. If not, the contents of the leading edge delay counter may require one of three possible changes depending upon other decisions to be made. This test for the presence of a bit 1 in position $M_0$ may be readily implemented by including that bit position in the logic network for implementing the steps indicated in the negative branch of the decision box 41.

If a leading edge has been declared, the signal $M_0$ will enable the logic network connected to the set (S) input terminal of the flip-flop $FF_1$ of FIG. 4 thereby implementing a decision box 42 to determine at time $t_2$ whether a trailing edge is being declared during the current sweep. If not, nothing else happens and at time $t_3$ the contents of the leading edge delay counter is restored in memory without alteration, thereby recirculating the leading edge delay counter. If a trailing edge is being declared, the flip-flop $FF_1$ is set and a signal TED from its true (Q) output terminal thereafter causes the leading edge delay counter to be stored, i.e. reported as part of the target data, and causes the contents of the leading edge delay counter to be changed to zero. As noted hereinbefore with reference to FIG. 1, that may be easily implemented by having the signal TED inhibit the transfer of the contents of the leading edge delay counter into memory, thereby substituting zero for the contents of the leading edge delay counter, while causing those contents to be transferred to the buffer register 15.

If the decision of the box 41 is negative, (i.e. $M_0=0$) the next step is to determine whether the contents of the sequential-observer detector during the last sweep was greater than zero (i.e. not equal to zero), as indicated by a decision box 43. If the decision box 43 indicates the contents of the sequential-observer detector is equal to zero, the next step is to determine whether the contents of the leading edge delay counter is equal to two, as indicated by a decision box 44. If so, the contents of the leading edge delay counter is incremented by one before it is recirculated (i.e. restored in memory), and if not, the contents of the leading edge delay counter is reset to zero before it is recirculated.

If the decision box 43 indicates that the contents of the sequential-observer detector is not equal to zero, the next step is to determine whether the contents of the leading edge delay counter is equal to seven as indicated by a decision box 45. If so, the contents of the leading edge delay counter are recirculated without alteration. As in the case of the first decision box 40, the decision box 45 need not be expressly implemented except by way of causing the last decision box 46 to fail to initiate either the operation of incrementing the contents of the leading edge delay counter by one or two, in which case, the contents of the leading edge delay counter will be restored in memory without alteration.

The last decision box 46 simply determines whether the contents of the leading edge delay counter is equal to six. If not, the leading edge delay counter should be incremented by two, and if so, by only one; otherwise, the contents of the leading edge delay counter may exceed the maximum of seven.

Referring now to FIG. 6 which is a straight-forward implementation of the flow chart of FIG. 5 for the environment of FIG. 1, the flip-flops $M_4$, $M_5$ and $M_6$ referred to as comprising the register of the leading edge delay counter 21 are shown as S-R flip-flops, but each may be a J-K flip-flop since both of its input terminals will not be true at the same time. The allocation of the flip-flops for the register is such that the least significant binary digit is stored in the flip-flop $M_4$ and the most significant digit of a 3-bit binary number is stored in the flip-flop $M_6$. The Q-output terminals of the flip-flops are connected to the write amplifiers 30 each through an inhibit gate shown in FIG. 1 collectively as one inhibit gate 33, as noted hereinbefore, such that after the flip-flops $M_4$, $M_5$ and $M_6$ have been set to a new state, as required at time $t_2$, their contents is transferred into memory at time $t_3$ unless a trailing edge has been declared, in which case their contents are transferred to the buffer register 15 through a delay counter transfer control 22.

In practice, the delay count transfer control 22, as well as the other transfer control functions represented by the blocks 14, 16 and 17, may be implemented as part of the buffer register 15 by providing as the buffer register 15 a bank of $n$ delay memory elements commonly referred to as D flip-flops having a single input and an output equal to the input one bit time earlier. The gate 29 then controls the application of the timing signal $t_3$ as a clock pulse to all D flip-flops. Unless and until the gate 29 is enabled by a signal TED indicating that a trailing edge has been declared, the D flip-flops of the buffer register 15 will remain in the states into which they were set the last time the gate 29 was enabled. Thus, the transfer control functions set forth in the blocks 14, 16, 17 and 22 of FIG. 1 become part of the inherent function of the buffer register 15 when the buffer register is implemented by D flip-flops. All the control necessary is then provided by the gate 29.

Once target report data has been transferred into the buffer register 15, the data may be read in parallel into the digital computer 20. Following that, the computer may be programmed to reset the buffer register 15 to zero, but that is not necessary since the contents of the buffer register 15 will be set in accordance with target report data the next time a target trailing edge is declared.

To avoid sampling the buffer register 15 at regular intervals, the digital computer 20 may be connected to the output signal TED of the sequential-observer detector 11 as shown in order that the stored program of the digital computer 20 may not read the buffer register 15 until a signal TED interrupts the program being executed by the computer through a conventional priority-interrupt system internal to the computer 20, at which time the digital computer 20 will branch to a subroutine for reading the contents of the buffer register 15 in a conventional manner.

The principle inputs to the logic network of FIG. 6 are the contents of flip-flops $M_4$ to $M_6$ each of which may be an R-S flip-flop, and all of which may be referred to collectively as the contents of the leading edge delay counter since, at any given time, the binary digits transferred into those flip-flops from core memory represent the values stored by the system for a given range bin.

With such an arrangement the logic network shown in FIG. 6 will do for a large number of leading edge delay counters, one for each of the 1,024 addressable core memory locations. At time $t_1$, those flip-flops $M_4$ to $M_6$ are set via AND gates 50 to correspond to the binary $C_4$, $\overline{C}_4$; $C_5$; and $C_6$, $\overline{C}_6$ at their input terminals in a conventional manner characteristic of core memory registers.

Other inputs connected to the flip-flops $M_4$ to $M_6$ via OR gates 41 are the contents of the flip-flops $M_1$, $M_2$ and $M_3$ which collectively are sometimes referred to herein as the contents of the sequential-observer detector. At time $t_2$, the contents of the flip-flops $M_1$ to $M_3$ are binary digits of the hit-miss count stored in the core memory 25 at time $t_3$ of the last sweep for the range bin indicated by the range counter. In some instances, the inputs to the logic network of FIG. 6 from the flip-flops $M_1$ to $M_6$ of the register 27 are the complements of the binary signals stored in those flip-flops as indicated by the standard convention of a bar over the letter M representing a particular flip-flop as indicated by the subscript numeral.

The remaining input signals to the logic network of FIG. 6 are the quantized video signal represented by the letters VR (video return) from the radar transmitter-receiver 10, and the false output terminal $\overline{M}_0$ of the flip-flop $M_0$ which is set by a signal LED. Thus once a leading edge has been declared during a given sweep for a particular range, the fact that a leading edge has been declared will be available for subsequent sweeps until a trailing edge is declared, at which time a target report is transferred out of the flip-flops $M_4$, $M_5$ and $M_6$. The false output terminal $\overline{M}_0$ is connected to AND gate 53 and 54 which, together with an AND gate 55 and an inverter 56, implement the decision boxes 40, 41, 42 and 43 of FIG. 5.

The decision box 40 is implemented by the inverter 57 connecting the VR signal to the AND gates 53 and 54 since, if a hit is received during the current range sweep, the outputs of the AND gates 53 and 54 will remain false, thereby disabling all of the rest of the logic network of FIG. 6. Thus, when a timing signal $t_2$ occurs, the rest of the network fails to alter the states of the flip-flops $M_4$ to $M_6$. Thereafter, at time $t_3$, the contents of those flip-flops are restored in memory, thereby recirculating the leading edge delay count.

The decision box 41 is implemented by the connection of the false output terminal $\overline{M}_0$ to the AND gates 53 and 54 since, once a leading edge has been declared, the flip-flop $M_0$ (FIG. 4) is set and the AND gates 53 and 54 are disabled. This allows the decision box 42 to function by an automatic recirculation of the contents of the flip-flops $M_4$ to $M_6$ until a trailing edge is declared, at which time the AND gate 29 is enabled to transmit the contents of the flip-flops $M_4$ to $M_6$ into the buffer register at time $t_3$ in accordance with the following transfer control equations:

$$d_4 = t_3 \cdot \text{TED} \cdot M_4$$

$$D_5 = t_3 \cdot \text{TED} \cdot M_5$$

$$D_6 = t_3 \cdot \text{TED} \cdot M_6$$

where $D_4$, $D_5$ and $D_6$ are D-type (delay memory) flip-flops of the resistor 15.

The next decision box 43 is effectively implemented by the AND gate 55 connected directly to the AND gate 53 and to the AND gate 54 by an inverter 56. If the contents of the sequential observer is equal to zero, the AND gate 53 is enabled by the AND gate 55 having all its input terminals true. If a leading edge has not been declared and a VR signal received, the contents of the flip-flops $M_4$ to $M_6$ are incremented by one if those contents are equal to two. AND gate 58 is enabled by all of its input terminals being true when those contents are equal to two, i.e. when the contents of the flip-flops $M_4$, $M_5$ and $M_6$ are 0, 1, and 0 respectively. AND gate 50 then sets the flip-flop $M_4$ at time $t_2$, thereby incrementing the contents of those flip-flops to three. If the contents of those flip-flops are not equal to two, the output of the AND gate 58 is false. An inverter 60 complements that false output, and thereby enables an AND gate 61 to reset the leading edge delay counter to zero by resetting the flip-flops $M_4$ to $M_6$ via OR gates 51 at time $t_2$.

If the contents of the sequential-observer detector is not equal to zero, all of the input terminals $\overline{M}_1$, $\overline{M}_2$ and $\overline{M}_3$ are not true and the AND gate 55 is not enabled. In that event, the AND gate 54 is enabled via the inverter 56 to lead into the decision boxes 45 and 46.

The decision box 45 is not expressly implemented, as noted hereinbefore. Only the decision box 46 is implemented by AND gates 62 to 67 and an OR gate 68. AND gate 62 enables AND gate 63 if the contents of the flip-flops $M_4$, $M_5$ and $M_6$ are equal to six. Then at time $t_2$, the contents is incremented to seven by setting the least significant bit position $M_4$. If the contents of the flip-flops $M_4$, $M_5$ and $M_6$ are not equal to six, as evidenced by either one of the two most significant bit positions $M_5$ and $M_6$ not being set, the OR gate 68 enables and AND gate 64 to increment the contents of the flip-flops $M_4$, $M_5$ and $M_6$ by two at time $t_2$.

To increment the contents of the leading edge delay counter by two, AND gates 65 and 66 will switch the flip-flop $M_5$ to its alternate state. If the flip-flop $M_5$ is in its binary 0 state (reset), as evidenced by its output terminal $\overline{M}5$ being true, the flip-flop $M_5$ is set via AND gate 65 thereby incrementing the contents of the flip-flops $M_4$, $M_5$ and $M_6$ by two regardless of the state of the flip-flops $M_4$ and $M_6$. However, if the flip-flops $M_5$ is in its binary 1 state (set), as evidenced by its output terminal $M_5$ being true, the flip-flop $M_5$ is reset via AND gate 66.

Upon resetting the flip-flop 66, a carry is effectively added into the next more significant bit position by setting the flip-flop $M_6$ via AND gate 67. This occurs only when the contents of the flip-flops $M_4$ to $M_6$ are equal to two and three, because if they are equal to six or seven, both output terminals $\overline{M}_5$ and $\overline{M}_6$ are false and the AND gates 64 to 67 remain disabled at time $t_2$. Instead, the contents are incremented by one if they are equal to zero, as noted hereinbefore with reference to AND gates 62 and 63, or left unaltered if they are equal to seven. In the latter case, the contents are merely recirculated at time $t_3$ when they are restored in the core memory 25 of FIG. 1 via write amplifiers 30.

From the foregoing, it should be appreciated that the present invention enables a target bearing obtained by a beam-splitting technique to be corrected for delay in detecting the leading edge due to the occurrence of false misses. As noted hereinbefore, the present invention may be extended to further provide for correction of any error due to delay in detecting the trailing edge of a target by inverting the operation of the delay counter to provide a weighted count of spurious hits instead of misses. The correction to be applied to the apparent target center would then be half the average of the leading and trailing edge delay counts. Since the two counts are to be added for averaging, the same delay counter may be used by simply adding to the stored counts of spurious misses the weighted counts of spurious hits encountered while searching for the trailing edge of a target. To obtain half the average of the total delay count, that total is then divided by four. Thus, although a particular embodiment of the present invention has been disclosed in an exemplary environment comprising a real-time surveillance radar system and a non-real-time computer for carrying out the beam-splitting calculations, it should be appreciated that the present invention is not limited to that particular embodiment and exemplary environment.

We claim:

1. A method for determining error in finding the leading edge of a target in a radar surveillance system, wherein binary signals are provided as quantized video returns representing hits and misses from a given range at successive azimuths as a radar transmitter-receiver sweeps in azimuth, and a target leading edge is found by incrementing by one a first counter in response to each hit until a predetermined threshold count is reached, at which time a target leading edge is declared and decrementing by one said first counter in response to each miss except when said second counter is at a count of zero, comprising:
   incrementing a second counter by two in response to each miss if the count of said first counter was not equal to zero after the last sweep at the preceding azimuth;
   incrementing said second counter by one in response to each miss if the count of said first counter was equal to zero after the last sweep at the preceding azimuth, and the count of said second counter was at the same time equal to two; and
   resetting said second counter to zero in response to a miss if the count of said first counter was equal to zero after the last sweep at the preceding azimuth, and the count of said second counter was at the same time not equal to zero.

2. A method as defined in claim 1 wherein said first counter is used to find a trailing edge by inverting its operation to increment on misses and decrement on hits after a leading edge is declared, and the azimuths of sweeps during which said leading and trailing edges are declared are used to compute an apparent target center, and the apparent target center is corrected to provide a bias corrected center by subtracting a number of azimuth sweep angles equal to said threshold count from said apparent target center, and said bias corrected center is further corrected for bias error by subtracting a number of azimuth sweep angles equal to the count in said second counter during the sweep in which said leading edge was declared.

3. A method as defined in claim 2 wherein said second counter is incremented in response to misses only until a predetermined maximum count is reached.

4. A method as defined in claim 3 wherein said maximum count is greater than said threshold count.

5. A method as defined in claim 3 wherein said maximum count is greater than said threshold count by one.

6. A method as defined in claim 5 wherein said maximum count is an add number, and said second counter is incremented by only one in response to a miss when the count in said second counter is one less than said maximum count and said second counter would otherwise be incremented by two.

7. In a surveillance radar system having a sequential-observer detector for declaring a target leading edge upon an up-down counter reaching a predetermined threshold count as it is incremented in response to each hit, and decremented except when at a count of zero, in response to each miss in each sweep at a given range as said radar scans in azimuth, a method for the correction of azimuth bias error in declaring said leading edge comprising:
 counting sweeps at said given range not producing a hit until said up-down counter reaches said threshold count, each sweep counted to produce a leading edge delay count being weighted to account for a delay in declaring a leading edge of a target according to predetermined patterns of hits and misses; and
 reporting said count with target leading edge azimuth data for subtraction of half the number of sweep angles equal to said count from a target azimuth computed from said leading edge azimuth data.

8. A method as defined in claim 7 wherein each count is weighted according to the following predetermined patterns:
 when said up-down counter is at a count not equal to zero, each sweep counted to produce said leading edge delay count has a weight of two until the total leading edge delay count reaches a maximum count, and a weight of one when the total leading edge delay count is one less than said maximum;
 when said up-down counter is at a count equal to zero, each sweep counted to produce said leading edge delay count has a weight of one if the total leading edge delay count is then equal to two; and
 when said up-down counter is at a count equal to zero and the total leading edge delay count is then not equal to two, the total leading edge delay count is reset to zero.

9. A method as defined in claim 8 wherein at the time a target leading edge is declared, said total leading edge delay count then attained is retained together with the azimuth of the sweep during which said target leading edge is declared until a target trailing edge is declared, where upon said total leading edge delay count is reported with the azimuths of sweeps during which said leading and trailing edges were declared as target data.

10. A method as defined in claim 9 wherein the target center is computed from reported target data to be the average of azimuths declared for said leading and trailing edges, less a predetermined azimuth bias equal to said threshold count in sweep angles, and less one-half said total leading edge delay count in sweep angles.

11. In a radar surveillance system, wherein binary signals are provided as quantized video returns representing hits and misses from a given range at successive azimuths as a radar transmitter-receiver sweeps in azimuth in search of a target, the combination comprising:
 up-down counting means for counting up in response to hits until a threshold count is reached, and down in response to misses, except when at a count of zero;
 storage means responsive to said up-down counting means for storing as a leading edge the azimuth of the sweep during which said threshold count is reached; and
 a leading edge delay counting means for determining error in declaring a leading edge of a target due to misses in the video return pattern occurring before said up-down counter reaches said threshold count by incrementing a leading edge delay count by two in response to each miss of the count of said up-down counter was not equal to zero after the last sweep at the preceding azimuth, incrementing said leading edge delay count by one in response to each miss if the count of said up-down counter was equal to zero after the last sweep at the preceding azimuth and said leading edge delay count was at the same time equal to two, and setting said leading edge delay count to zero in response to a miss if the count of said up-down counter was equal to zero after the last sweep at the preceding azimuth, and said leading edge delay count was at the same time not equal to zero.

12. Apparatus as defined in claim 11 including:
 means for inverting the operation of said up-down counter to count up from zero misses and down on hits upon said leading edge azimuth being stored;
 means responsive to said up-down counting means for transmitting a trailing edge azimuth the azimuth of the sweep during which said threshold count is reached after said leading edge azimuth is stored; and
 means for transmitting simultaneously with said trailing edge azimuth said leading edge delay count and said leading edge azimuth from said leading edge delay counting means and said storage means, respectively, whereby a target center can be computed from transmitted leading and trailing edge azimuth data and corrected by said transmitted leading edge delay count.

13. Apparatus as defined in claim 12 wherein said leading edge delay counter is incremented in response to misses only until a predetermined maximum count is reached.

14. Apparatus as defined in claim 13 wherein said maximum count is greater than said threshold count.

15. Apparatus as defined in claim 13 wherein said maximum count is greater than said threshold count by one.

16. Apparatus as defined in claim 15 wherein said maximum count is an add number, and said leading edge delay counter is incremented by only one in response to a miss when the count therein is one less than said maximum count and said leading edge delay counter would otherwise be incremented by two.

17. In a surveillance radar system having an apparatus which declares a target leading edge upon an up-down counter reaching a predetermined count as it is incremented in response to each hit and decremented, except when at a count of zero, in response to each miss in each sweep at a given range as said radar scans in azimuth, and improvement for the correction of azimuth bias error comprising:
 first means for indicating the azimuth of a sweep when a leading edge of a target has been declared;
 a leading edge delay counting means counting sweeps at said given range not producing a hit, each leading edge delay count being weighted to account for delay in declaring a leading edge of a target according to predetermined patterns of hits and misses until said indicating means indicates a leading edge azimuth of a target; and
 means for transmitting the leading edge delay count from said counting means with said target leading edge azimuth for correction of a target azimuth derived from said leading edge azimuth.

18. The improvement defined in claim 17 wherein said leading edge delay counting means comprises:
 means for incrementing the contents thereof by two in response to a miss when said up-down counter is at a count not equal to zero, until said contents reaches a maximum of seven, and for incrementing by one in response to a miss when said up-down counter is at a count of six;
 means for incrementing said contents by one when said up-down counter is at a count equal to zero, if said contents is then equal to two; and
 means for resetting said contents to zero when said up-down counter is at a count equal to zero and said contents is then not equal to two.

19. The improvement as defined in claim 18 wherein said apparatus proceeds to search for and declare a trailing edge of a target once a leading edge has been declared, and wherein said leading edge delay counting means includes:
 means responsive to said first means for retaining said contents unaltered once a leading edge of a target is declared until a target trailing edge is declared; and first data transfer means for reporting said contents as a leading edge delay count upon said trailing edge being declared.

20. The improvement as defined in claim 19 including:
means for counting azimuth sweeps;
storage means for storing the contents of said azimuth sweep counting means when a leading edge is declared by said apparatus;
second data transfer means for reporting as target data upon said trailing edge being declared the contents of said storage means, and the contents of said azimuth sweep counting means when said first data transfer means reports said contents of said leading edge delay counting means; and
means for receiving said target data from said first and second data transfer means.

21. In a surveillance radar system having apparatus for determining the center azimuth of a target by first detecting a predetermined number of sweeps producing hits for determining the leading edge azimuth of said target, then detecting a predetermined number of sweeps producing misses for determining the trailing edge azimuth of said target, and subsequently providing a bias correction to said leading and trailing edge azimuths by subtracting a number of sweep angles equal to said predetermined number from an average of said leading and trailing edge azimuths, apparatus for the correction of error in determining the leading edge of said target comprising:
first means for detecting predetermined patterns of sweeps which produce at the leading edge of said target spurious misses that cause a delay in reaching said predetermined number of hits; and
second means responsive to said first means for developing for each of said patterns a compensating number substantially corresponding to the error in said average of said leading and trailing edge azimuths.

22. Apparatus as defined by claim 21 including computing means and transfer means for reporting to said computing means said compensating number along with leading and trailing edge azimuths to said computing means for determination and correction of said center azimuth of said target.